US009980443B2

(12) United States Patent
Kidachi

(10) Patent No.: US 9,980,443 B2
(45) Date of Patent: *May 29, 2018

(54) EMITTER AND DRIP IRRIGATION TUBE

(71) Applicant: Enplas Corporation, Saitama (JP)

(72) Inventor: Masahiro Kidachi, Saitama (JP)

(73) Assignee: ENPLAS CORPORATION, Saitama (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/104,331

(22) PCT Filed: Nov. 27, 2014

(86) PCT No.: PCT/JP2014/081309
§ 371 (c)(1),
(2) Date: Jun. 14, 2016

(87) PCT Pub. No.: WO2015/093246
PCT Pub. Date: Jun. 25, 2015

(65) Prior Publication Data
US 2016/0309669 A1 Oct. 27, 2016

(30) Foreign Application Priority Data
Dec. 16, 2013 (JP) .................................. 2013-259219

(51) Int. Cl.
B05B 15/00 (2018.01)
A01G 25/16 (2006.01)
(Continued)

(52) U.S. Cl.
CPC ........... *A01G 25/165* (2013.01); *A01G 25/02* (2013.01); *A01G 25/023* (2013.01); *B05B 12/088* (2013.01)

(58) Field of Classification Search
CPC .... A01G 25/165; A01G 25/02; A01G 25/023; A01G 2025/006; A01G 27/003;
(Continued)

(56) References Cited

U.S. PATENT DOCUMENTS 4,687,143 A * 8/1987 Gorney ................ A01G 25/023
239/542
5,203,503 A 4/1993 Cohen
(Continued)

FOREIGN PATENT DOCUMENTS

EP 0444425 A1 9/1991
EP 0636309 A1 2/1995
(Continued)

OTHER PUBLICATIONS

International Search Report from International Application No. PCT/JP2014/081309 dated Jan. 27, 2015.
(Continued)

Primary Examiner — Arthur O Hall
Assistant Examiner — Adam J Rogers
(74) Attorney, Agent, or Firm — Brundidge & Stanger, P.C.

(57) ABSTRACT

An emitter (120) includes a flow path from a water intake path (221), which is for taking in irrigation liquid within a tube, to a recessed part (251). This flow path includes a recessed surface part (242) closed, without contact, by a film (300). A channel (243) that forms a reduced pressure flow path included in the above flow path is formed on the surface of the recessed surface part (242). If the film (300) is pressed by the pressure of the irrigation liquid in the tube (110) and adheres to the recessed surface part (242), the flow rate of the irrigation liquid inside the emitter (120) is controlled to an amount that can pass through the channel (243).

6 Claims, 10 Drawing Sheets

(51) Int. Cl.
*A01G 25/02* (2006.01)
*B05B 12/08* (2006.01)

(58) Field of Classification Search
CPC .. A01G 27/008; B05B 12/088; B05B 1/3006; B05B 1/20; B05B 1/323
USPC ........................................................ 239/542
See application file for complete search history.

(56) References Cited

U.S. PATENT DOCUMENTS

| | | | |
|---|---|---|---|
| 5,246,170 A * | 9/1993 | Woidt | B05B 1/323 239/520 |
| 5,400,973 A * | 3/1995 | Cohen | A01G 25/023 239/533.1 |
| 5,586,727 A * | 12/1996 | Shekalim | A01G 25/023 239/542 |
| 5,609,303 A | 3/1997 | Cohen | |
| 5,634,594 A | 6/1997 | Cohen | |
| 6,027,048 A * | 2/2000 | Mehoudar | A01G 25/023 138/42 |
| 6,213,408 B1 * | 4/2001 | Shekalim | A01G 25/023 239/1 |
| 6,302,338 B1 | 10/2001 | Cohen | |
| 7,445,168 B2 * | 11/2008 | Ruskin | A01G 25/023 239/542 |
| 7,648,085 B2 * | 1/2010 | Mavrakis | A01G 25/023 138/40 |
| 7,681,810 B2 * | 3/2010 | Keren | A01G 25/023 138/42 |
| 8,302,887 B2 * | 11/2012 | Park | A01G 25/023 239/542 |
| 2015/0150199 A1 | 6/2015 | Kidachi | |

FOREIGN PATENT DOCUMENTS

JP    2010-046094 A    3/2010
WO    2013175802 A1    11/2013

OTHER PUBLICATIONS

Extended European Search Report for 14871863.8 dated Jul. 14, 2017.

* cited by examiner

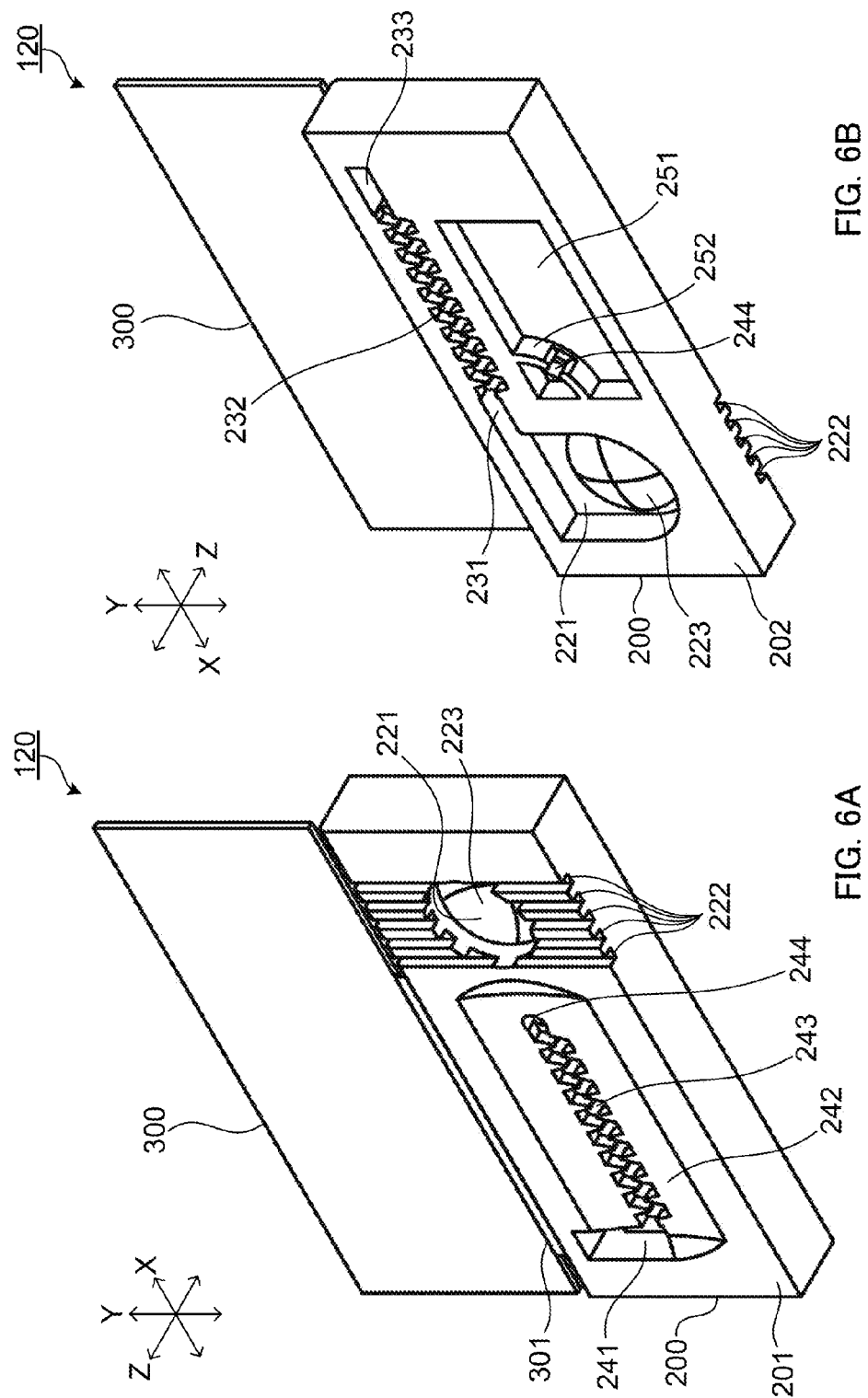

EMITTER AND DRIP IRRIGATION TUBE

TECHNICAL FIELD

The present invention relates to an emitter and a trickle irrigation tube including the emitter.

BACKGROUND ART

A trickle irrigation method is known as a method for culturing plants. In the trickle irrigation method, for example, a trickle irrigation tube is disposed on the soil in which plants are planted, and irrigation liquid such as water and liquid fertilizer is slowly supplied from the trickle irrigation tube to the soil. The trickle irrigation method can minimize the consumption amount of the irrigation liquid, and has been increasingly attracting attention in recent years.

The trickle irrigation tube typically has a tube and an emitter (also called "dripper"). The emitter typically supplies the soil with the irrigation liquid in the tube at a predetermined rate at which the irrigation liquid is dropped to the soil. Emitters which are pierced into the tube from the outside, and emitters joined to the inner wall surface of the tube are known.

For example, the latter emitter has a channel including a pressure reduction channel for allowing the irrigation liquid having entered the emitter from the internal space of the tube toward the through hole of the tube while reducing the pressure of the liquid, and a diaphragm part configured to change the volume of a portion of the channel where the irrigation liquid having reduced pressure flows in accordance with the pressure of the liquid in the tube. The emitter is composed of a member which is joined to the inner wall surface of the tube, a member which is disposed on the member joined to the inner wall surface, and a diaphragm part which is disposed between the two members. The diaphragm part is composed of an elastic film such as a silicone rubber film (see, for example, PTL 1).

The emitter can suppress variation of the discharge rate of the irrigation liquid regardless of change of the pressure of the irrigation liquid in the tube. Therefore, the emitter is advantageous from the viewpoint of uniformly growing multiple plants.

CITATION LIST

Patent Literature

PTL 1
Japanese Patent Application Laid-Open No. 2010-46094

SUMMARY OF INVENTION

Technical Problem

The emitter is formed by assembling three components. In view of this, the emitter may cause assembling error. In particular, the assembling error of the diaphragm part may cause variation of the operation of the diaphragm part, and variation of the discharge rate of the irrigation liquid.

In addition, the emitter is typically a molded article of an inexpensive resin such as polyethylene and polypropylene, and the diaphragm part is composed of a more expensive elastic material such as a silicone rubber film. The use of components of different materials has a room for improvement in material cost reduction.

Generally, in a trickle irrigation tube, hundreds of emitters are disposed in one tube in some cases. In a long trickle irrigation tube, the supply pressure of irrigation liquid to the tube is required to be increased, and consequently the discharge rate of the irrigation liquid of the emitter may not be stable. In view of this, control of the discharge rate of the irrigation liquid of the emitter in accordance with the pressure of the irrigation liquid in the tube is desired.

Furthermore, from the viewpoint of reducing the material cost and the manufacturing cost of the emitter, an emitter which can be manufactured with a single inexpensive material and fewer number of components is desired.

An object of the present invention is to provide an emitter which can stabilize the discharge rate of the irrigation liquid and can further reduce the manufacturing cost. In addition, another object of the present invention is to provide a trickle irrigation tube having the emitter.

Solution to Problem

The present invention provides an emitter for quantitatively discharging irrigation liquid in a tube from a discharge port communicating between inside and outside of the tube, the emitter being configured to be joined to an inner wall surface of the tube at a position corresponding to the discharge port, the tube being configured to distribute the irrigation liquid, the emitter including: an intake part for receiving the irrigation liquid in the tube; a first channel for allowing the irrigation liquid received from the intake part to flow therethrough; a flow rate control part for controlling a flow rate of the irrigation liquid supplied from the first channel in accordance with a pressure of the irrigation liquid in the tube; and a discharge part to face the discharge port, the discharge part being configured to be supplied with the irrigation liquid whose flow rate is controlled by the flow rate control part; the flow rate control part including: a recessed surface part formed at a portion of a surface of the emitter where the surface of the emitter is not joined to the tube, a groove connecting the first channel and the discharge part and formed on a surface of the recessed surface part, and a film having flexibility and configured to seal the recessed surface part to block communication between inside of the tube and the recessed surface part. The intake part or the first channel reduces a pressure of the irrigation liquid, and, when the pressure of the irrigation liquid in the tube is equal to or higher than a predetermined value, the film makes close contact with the recessed surface part, and the groove and the film form a second channel for allowing the irrigation liquid to flow therethrough.

In addition, the present invention provides a trickle irrigation tube including a tube; and at least one emitter, the emitter being the above-mentioned emitter disposed on the tube.

Advantageous Effects of Invention

The emitter according to the present invention controls the discharge rate of the irrigation liquid in accordance with the pressure of the irrigation liquid in the trickle irrigation tube, and thus can stabilize the discharge rate of the irrigation liquid. In addition, since the emitter according to the present invention can be formed with one or two components by injection molding of a resin material, the manufacturing cost can be further reduced in comparison with conventional emitters composed of three parts.

BRIEF DESCRIPTION OF DRAWINGS

FIG. 6A illustrates a top surface, a front surface and a side surface of the emitter according to the embodiment in the state before a film is joined to an emitter main body, and FIG. 6B illustrates a bottom surface, a front surface and a side surface of the emitter;

DESCRIPTION OF EMBODIMENTS

In the following, embodiments of the present invention will be described in detail with reference to the accompanying drawings.

[Embodiment 1]
(Configuration)

Figure 1:
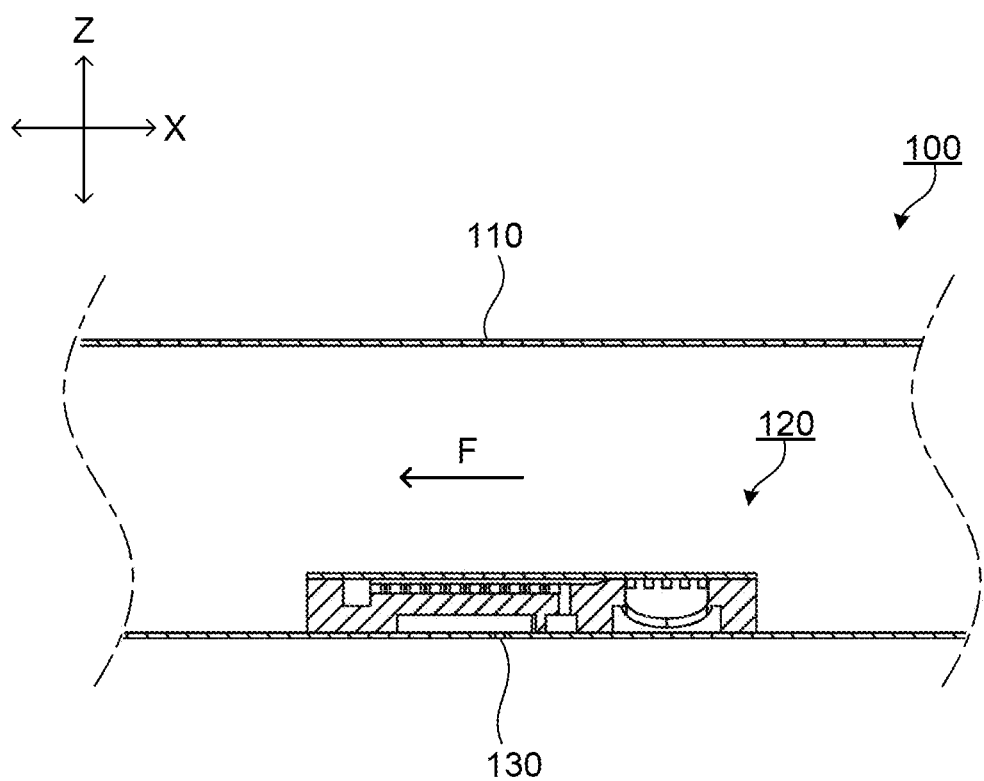
FIG. 1 is a schematic sectional view of a trickle irrigation tube according to an embodiment of the present invention.

FIG. 1 is a schematic sectional view of a trickle irrigation tube according to Embodiment 1 of the present invention. Trickle irrigation tube 100 is composed of tube 110 and emitter 120. Tube 110 is made of, for example, polyethylene. Emitters 120 are disposed along the axis direction at a predetermined interval (for example, 200 to 500 mm) Each emitter 120 is joined on the inner wall surface of tube 110. Emitter 120 disposed at a position where it covers discharge port 130 of tube 110. Discharge port 130 is a hole extending through the pipe wall of tube 110. Discharge port 130 has a hole diameter of, for example, 1.5 mm. It is to be noted that arrow F indicates the flow direction of the irrigation liquid in tube 110.

Figure 2A:
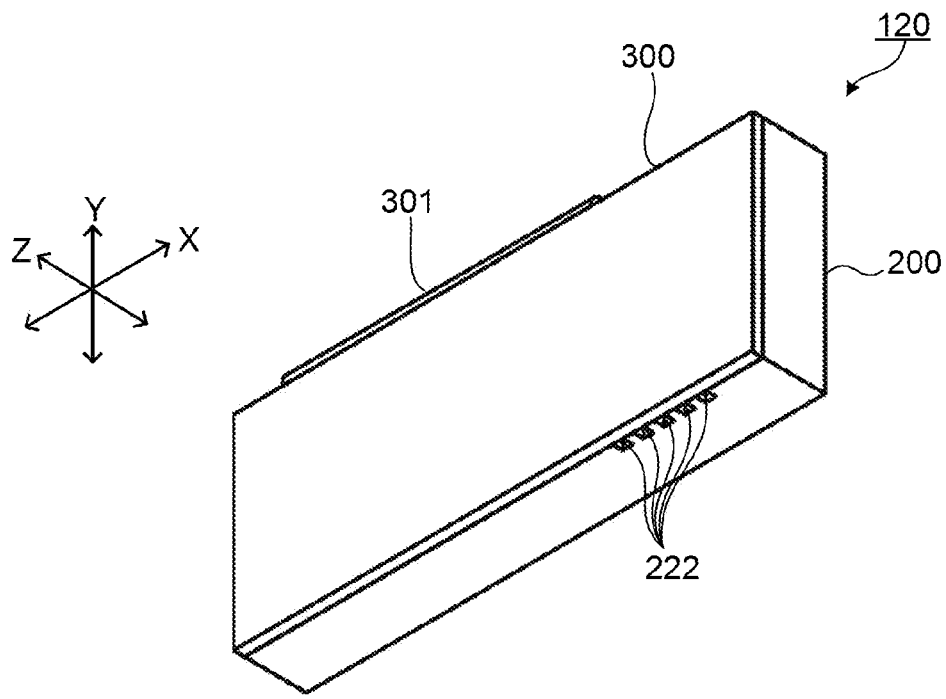
FIG. 2A illustrates a top surface, a front surface and a side surface of an emitter according to the embodiment.
Figure 2B:
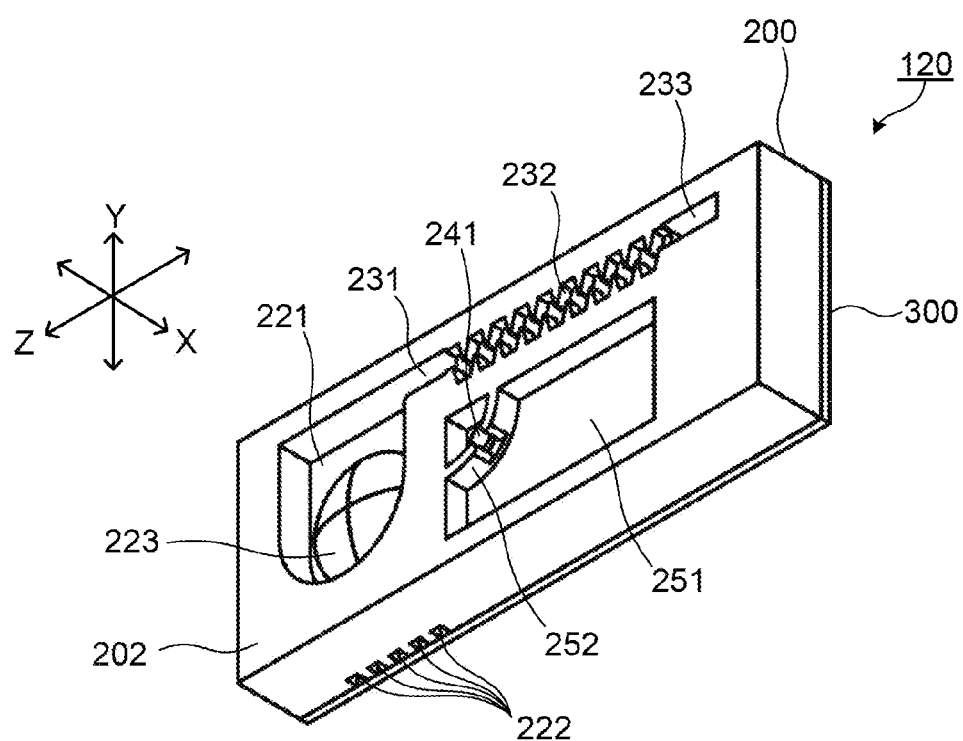
FIG. 2B illustrates a bottom surface, a front surface and a side surface of the emitter.
Figure 3A:
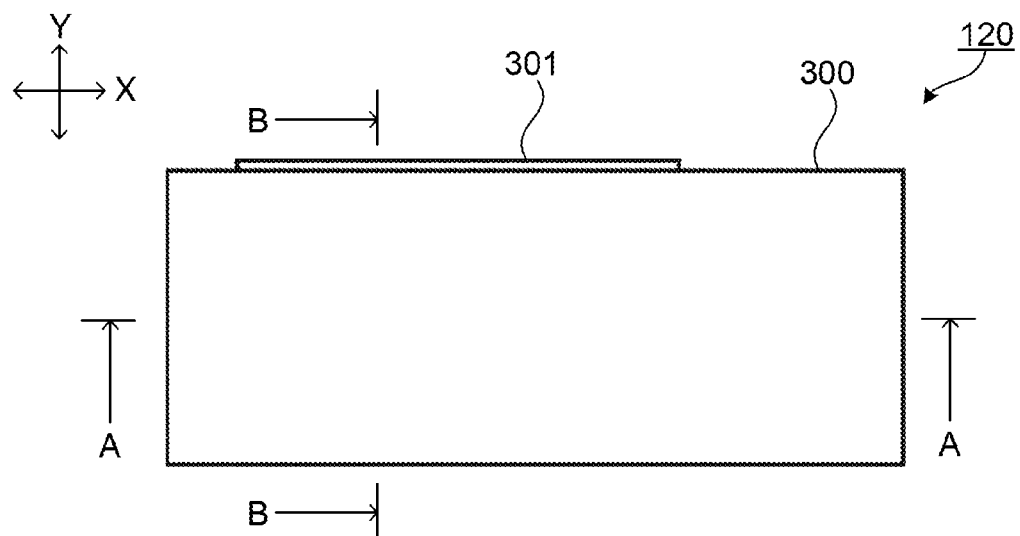
FIG. 3A is a plan view of the emitter according to the embodiment.
Figure 3B:
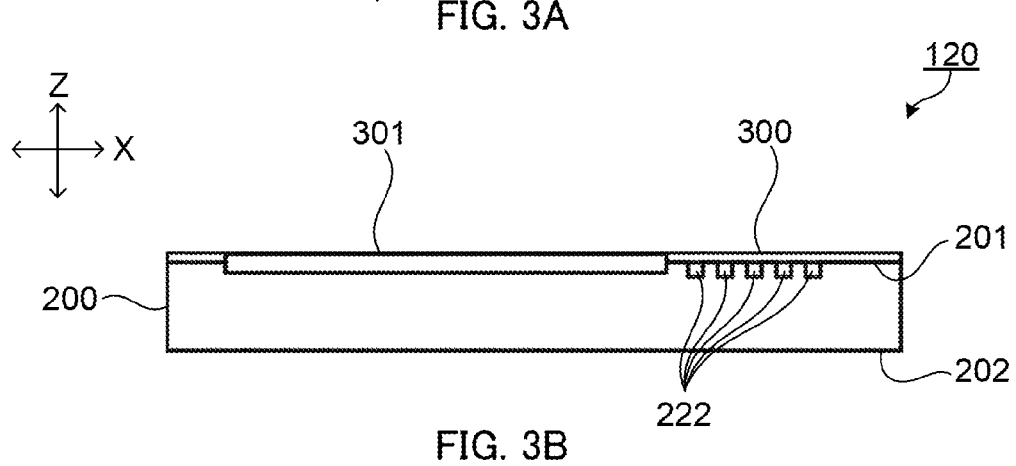
FIG. 3B is a back view of the emitter.
Figure 3C:
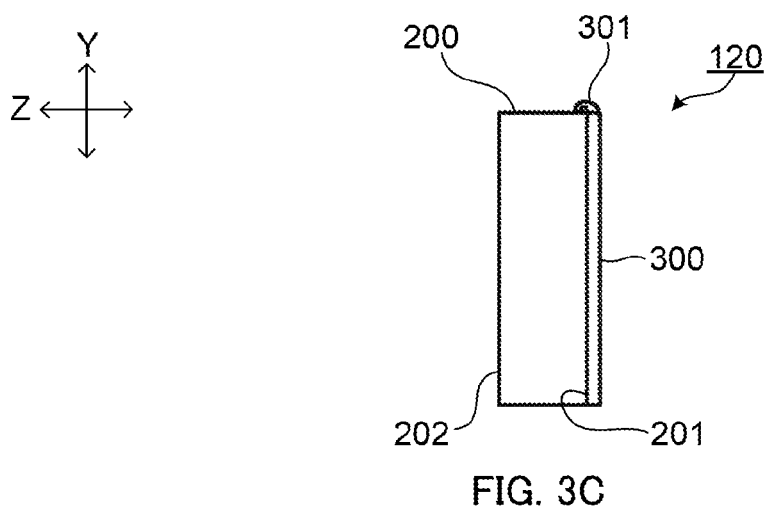
FIG. 3C is a side view of the emitter.
Figure 4A:
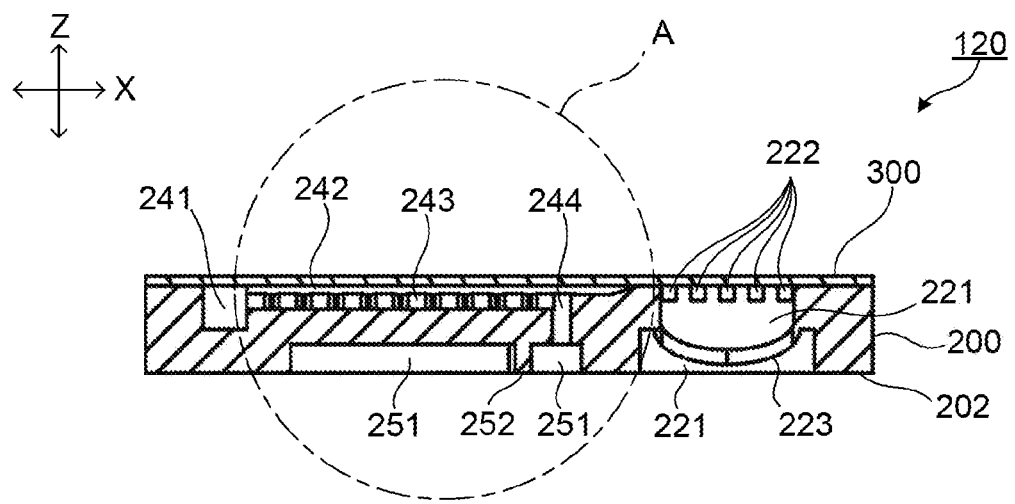
FIG. 4A is a sectional view of the emitter according to the embodiment taken along line A-A of FIG. 3A.
Figure 4B:
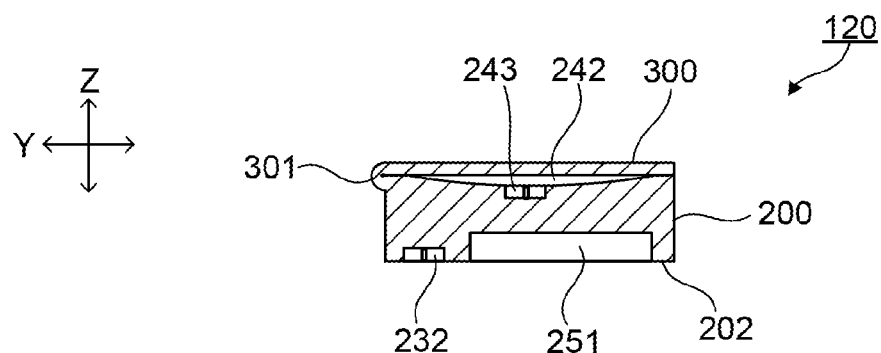
FIG. 4B is a sectional view of the emitter taken along line B-B of FIG. 3A.
Figure 5A:
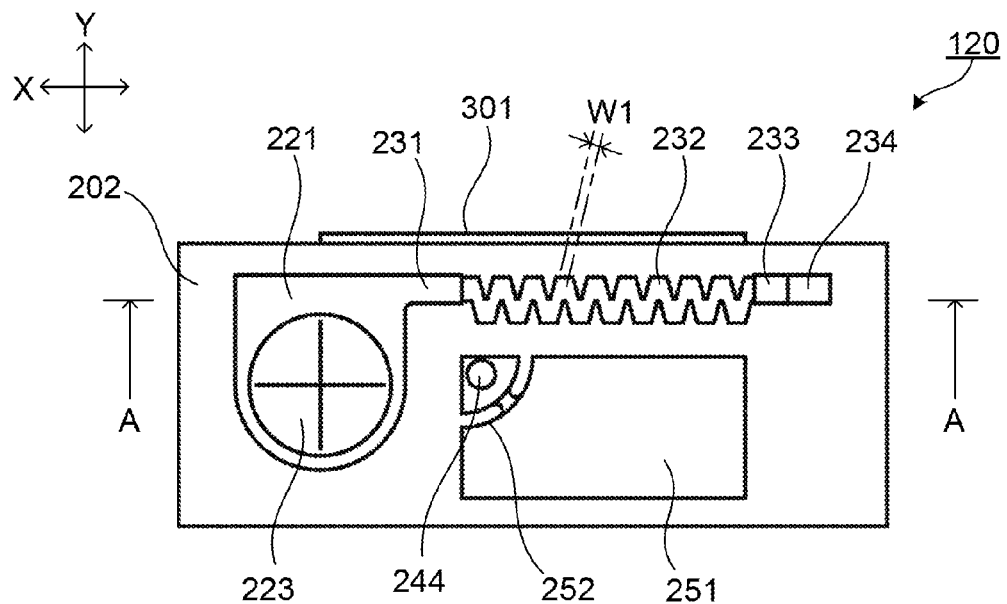
FIG. 5A is a bottom view of the emitter according to the embodiment.
Figure 5B:
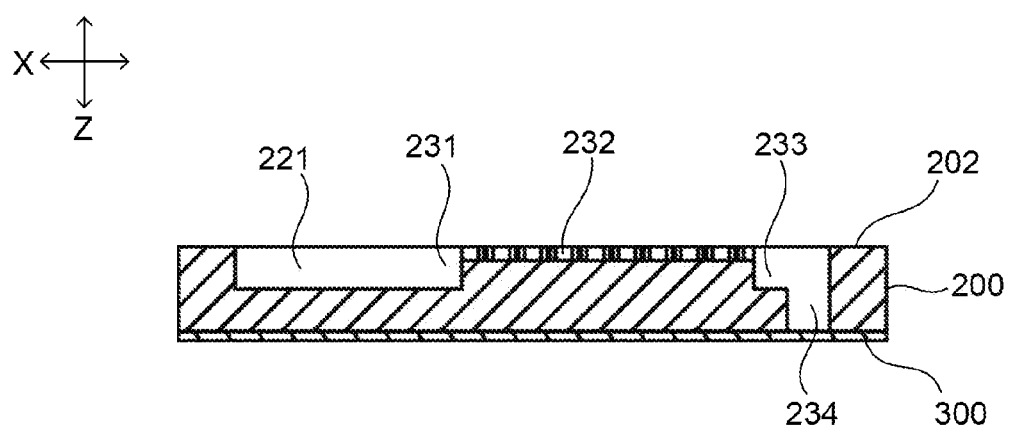
FIG. 5B is a sectional view of the emitter taken along line A-A of FIG. 5A.

FIG. 2A illustrates a top surface, a front surface and a side surface of emitter 120, and FIG. 2B illustrates a bottom surface, a front surface and a side surface of emitter 120. In addition, FIG. 3A is a plan view of emitter 120, FIG. 3B is a rear view of emitter 120, and FIG. 3C is a side view of emitter 120. In addition, FIG. 4A is a sectional view of emitter 120 taken along line A-A of FIG. 3A, FIG. 4B is a sectional view of emitter 120 taken along line B-B of FIG. 3A, FIG. 5A is a bottom view of emitter 120, and FIG. 5B is a sectional view of emitter 120 taken along line A-A of FIG. 5A. It is to be noted that the X direction is the axial direction of tube 110 or the longitudinal direction of emitter 120, the Y direction is the short (width) direction of emitter 120, and the Z direction is the height direction of emitter 120.

As illustrated in FIG. 2A and FIG. 2B, emitter 120 has a cuboid-like external shape. For example, the length of emitter 120 is 25 mm in the X direction, 10 mm in the Y direction, and 3 mm in the Z direction. Emitter 120 includes emitter main body 200 to be joined to the inner wall surface of tube 110, and film 300 which is formed integrally with emitter main body 200.

Figure 7A:
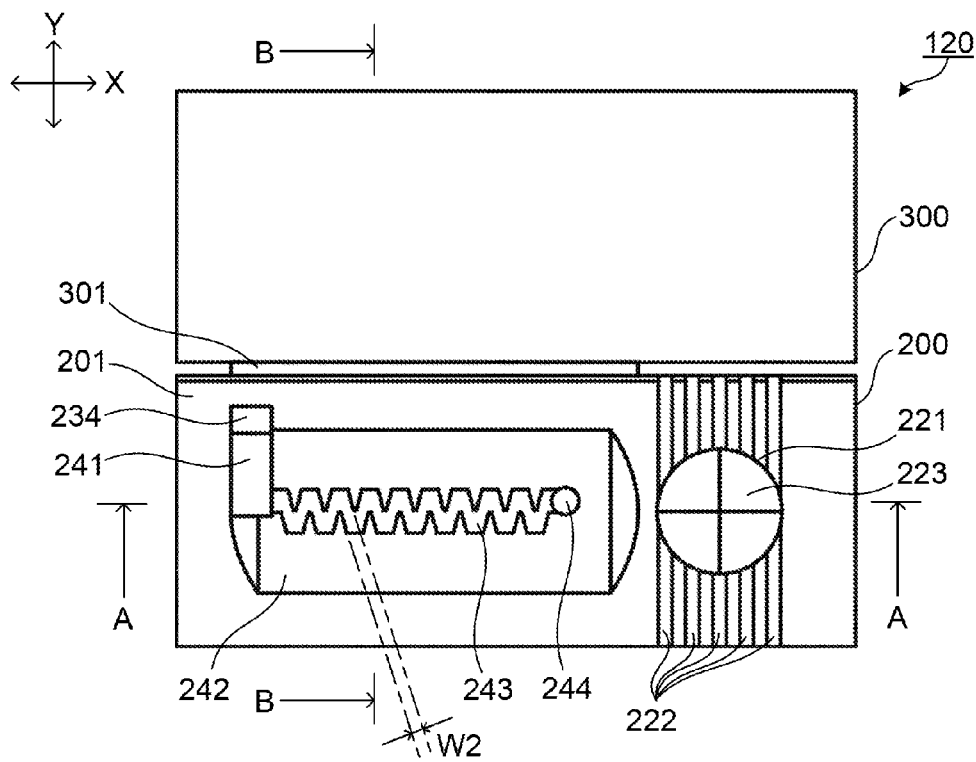
FIG. 7A is a plan view of the emitter according to the embodiment in the state before a film is joined to the emitter main body.
Figure 7B:
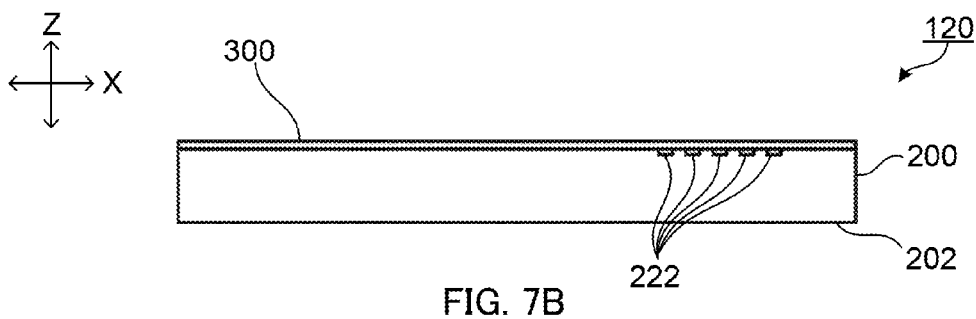
FIG. 7B is a rear view of the emitter.
Figure 7C:
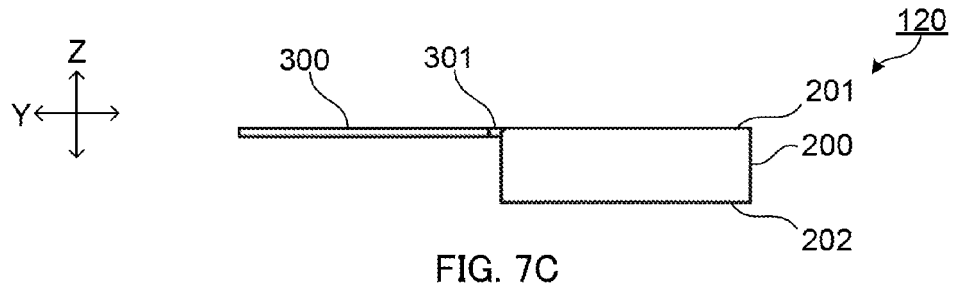
FIG. 7C is a side view of the emitter.
Figure 8A:
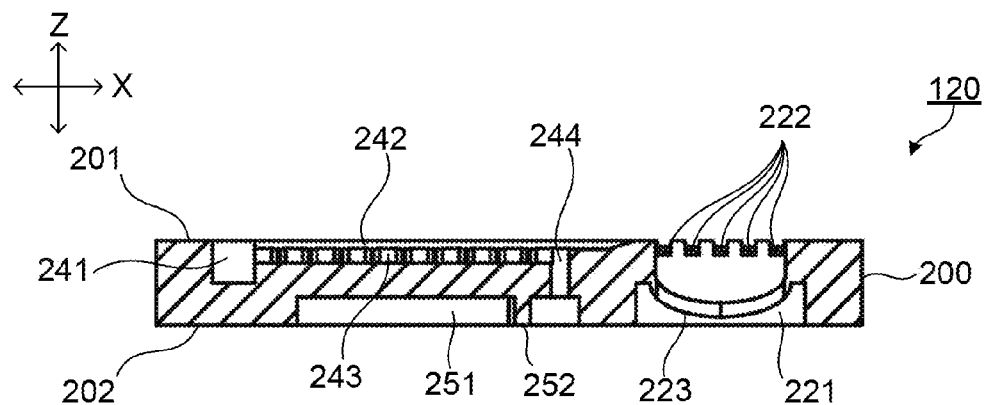
FIG. 8A is a sectional view of the emitter according to the embodiment taken along line A-A of FIG. 7A in the state before the film is joined to emitter the main body.
Figure 8B:
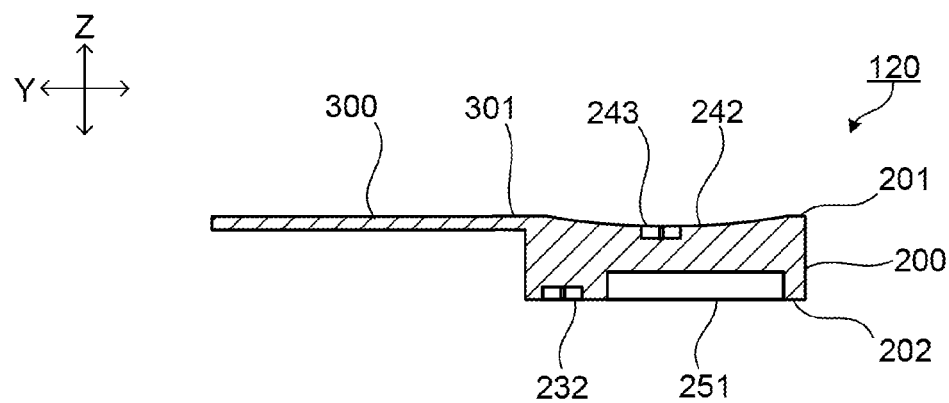
FIG. 8B is a sectional view of the emitter taken along line B-B of FIG. 7A.
Figure 9A:
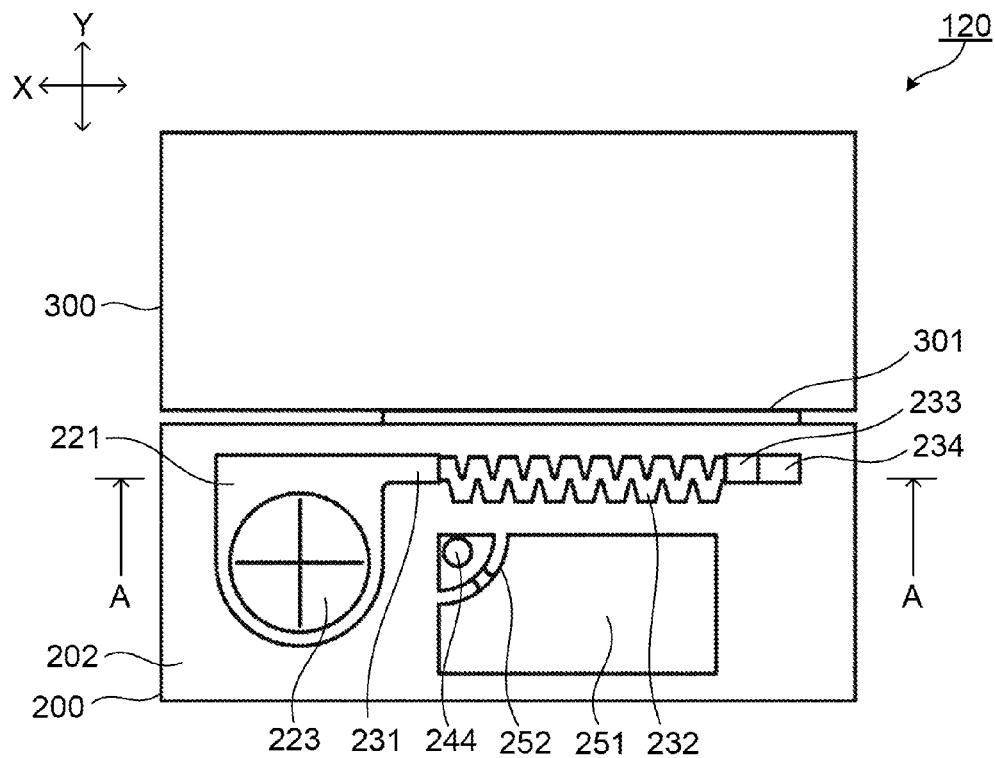
FIG. 9A is a bottom view of the emitter according to the embodiment in the state before the film is joined to an emitter main body.
Figure 9B:
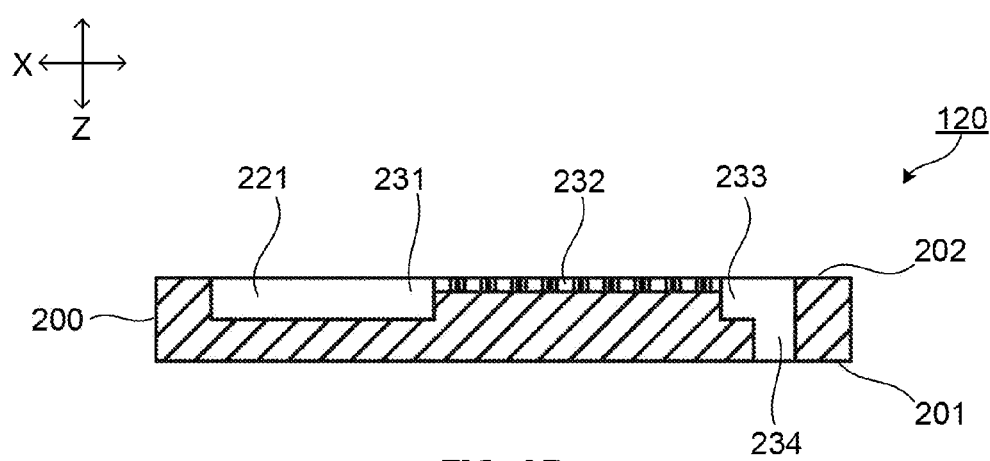
FIG. 9B is a sectional view of the emitter taken along line A-A of FIG. 9A.

FIG. 6A illustrates a top surface, a front surface and a side surface of emitter 120 in the state before film 300 is joined to emitter main body 200, and FIG. 6B illustrates a bottom surface, a front surface and a side surface of emitter 120. In addition, FIG. 7A is a plan view of emitter 120 in the state before film 300 is joined to emitter main body 200, FIG. 7B is a rear view of the emitter 120, and FIG. 7C is a side view of the emitter 120. Further, FIG. 8A is a sectional view of emitter 120 taken along line A-A of FIG. 7A in the state before film 300 is joined to emitter main body 200, FIG. 8B is a sectional view of emitter 120 taken along line B-B of FIG. 7A, FIG. 9A is a bottom view of the emitter 120, and FIG. 9B is a sectional view of the emitter 120 taken along line A-A of FIG. 9A.

As illustrated in FIG. 3B and FIG. 3C, emitter main body 200 includes first surface 201 and second surface 202. First surface 201 is one surface which is joined to film 300 in the Z direction. Second surface 202 is the other surface which is joined to the inner wall surface of tube 110 in the Z direction.

As illustrated in FIG. 6A, FIG. 6B, FIG. 7A and FIG. 8A, emitter main body 200 includes intake channel 221 extending through emitter main body 200 in the Z direction, a plurality of grooves 222 formed from the side edge of first surface 201 to the opening of intake channel 221, and flow rate regulation valve 223 disposed in intake channel 221.

The shape of the opening of intake channel 221 at first surface 201 is a circular shape as illustrated in FIG. 7A. The opening diameter of intake channel 221 is, for example, 5 mm. As illustrated in FIG. 9A, the shape of the opening of intake channel 221 at second surface 202 is a shape (bell shape) which is formed with a semicircle of the above-mentioned circle and a rectangular which has a width of the diameter of the opening and extends in the Y direction from the diameter of the semicircle.

As illustrated in FIG. 7A, groove 222 is a linear groove formed along the Y direction on first surface 201 of emitter main body 200. A plurality of grooves 222 are formed on both sides of intake channel 221 in the Y direction. Groove 222 has a depth of, for example, 0.5 mm.

As illustrated in FIG. 7A and FIG. 9A, flow rate regulation valve 223 is composed of four flexible opening-closing parts and closes intake channel 221. As illustrated in FIG. 8A, the opening-closing parts have a form in which a substantially hemisphere thin dome protruding from first surface 201 side toward second surface 202 side is divided with slits in a cross shape. The opening-closing part has a thickness of, for example, 0.5 mm, and, normally, the slit has a width of, for example, 0 mm.

As illustrated in FIG. 6B, FIG. 9A and FIG. 9B, emitter main body 200 further includes, on second surface 202, three grooves 231, 232 and 233 and hole 234 communicating between groove 233 and the first surface 201 side.

As illustrated in FIG. 5A and FIG. 9A, groove 231 is connected with intake channel 221. Groove 231 is a linear groove formed on second surface 202 and extending along the X direction.

As illustrated in FIG. 5A and FIG. 9A, groove 232 is connected with groove 231. Groove 232 is a groove formed on second surface 202 and extending along the X direction. In plan view, groove 232 has a zigzag shape. In the zigzag shape, protrusions having a substantially triangular shape protruding from the side surface of groove 232 are alternately disposed along the extending direction (the X direction) of groove 232. The protrusions are disposed such that the tip of each protrusion does not exceed the central axis line of groove 232 in plan view. Groove 232 has a depth of, for example, 0.5 mm, and groove 232 has a width (W1 in FIG. 5) of, for example, 0.5 mm.

As illustrated in FIG. 5A and FIG. 9A, groove 233 is connected with groove 232. Groove 233 is a linear groove formed on second surface 202 and extending along the X direction.

As illustrated in FIG. 5A and FIG. 9A, hole 234 opens at an end portion of groove 233. The opening shape of hole 234 is a rectangular shape. As illustrated in FIG. 5B and FIG. 9B, hole 234 opens at first surface 201. Grooves 231 and 233 and hole 234 have a width (the length in the Y direction) of, for example, 1 mm.

As illustrated in FIG. 6A, FIG. 7A and FIG. 8A, emitter main body 200 further includes groove 241 formed on first surface 201, recessed surface part 242 formed on first surface 201, groove 243 formed on the bottom of recessed surface part 242 and extending toward intake channel 221, and hole 244 communicated with second surface 202 side from an end of groove 243 on intake channel 221 side.

As illustrated in FIG. 7A, groove 241 is a linear groove formed along the Y direction on first surface 201. In plan view, groove 241 has a rectangular shape. Hole 234 opens at an end portion of groove 241.

As illustrated in FIG. 7A, recessed surface part 242 is a recess formed on first surface 201. In plan view, recessed surface part 242 has a racetrack-like shape composed of a rectangular part and substantially semicircular parts connected with both ends of the rectangular part in the X direction.

As illustrated in FIG. 8B, the rectangular part is formed as a recessed curved surface which is curved with respect to the Z direction and is parallel to the X direction. That is, the valley bottom line of the recessed curved surface extends along the X direction. The curve of the rectangular part in the cross-section along the Y direction of emitter main body 200 (FIG. 8B) includes a curve which is defined by film 300 in the above-mentioned cross-section under a pressure of the irrigation liquid in tube 110 which is equal to or higher than a predetermined value.

As illustrated in FIG. 8A, in X direction, the substantially semicircular part is formed of an inclined surface which is inclined from first surface 201 toward the recessed curved surface. As illustrated in FIG. 7A, groove 241 overlaps one end of recessed surface part 242 as viewed from the Z direction, and is thus directly connected with recessed surface part 242.

As illustrated in FIG. 8A, recessed surface part 242 has a depth smaller than that of groove 241. For example, groove 241 has a depth from first surface 201 of 1 mm, whereas recessed surface part 242 has a depth (height from first surface 201 to the valley bottom line (bottom) of recessed surface part 242) of 0.3 mm. It is to be noted that the length of recessed surface part 242 (the distance between vertexes of the substantially semicircular parts in the X direction) is, for example, 15 mm, and the width of recessed surface part 242 (the length of the rectangular part in the Y direction) is, for example, 6 mm.

As illustrated in FIG. 7A, groove 243 is connected with groove 241. As illustrated in FIG. 7A and FIG. 8A, groove 243 is a groove formed on recessed surface part 242 and extending along the valley bottom line of recessed surface part 242 (X direction) from groove 241 toward intake channel 221. In plan view, groove 243 has a zigzag shape as illustrated in FIG. 7A. In the zigzag shape, protrusions having a substantially triangular shape protruding from the side surface of groove 243 are alternately disposed along the extending direction (the X direction) of groove 243. The protrusions are disposed such that the tip of each protrusion does not exceed the central axis line of groove 243 in plan view. The depth of groove 243 (the depth from the valley bottom line of recessed surface part 242) is, for example, 0.5 mm, and the width of groove 243 (W2 in FIG. 7A) is, for example, 0.5 mm.

As illustrated in FIG. 7A, hole 244 opens at an end portion of groove 243 on intake channel 221 side. The opening of hole 244 has a circular shape. As illustrated in FIG. 8A, hole 244 also opens at second surface 202 side. The diameter of hole 244 is, for example, 1 mm.

As illustrated in FIG. 5A and FIG. 9A, emitter main body 200 further includes recess 251 which is formed on second surface 202 and at which hole 244 opens.

As illustrated in FIG. 9A, recess 251 is a recess formed on second surface 202. In plan view, recess 251 has a rectangular shape, and hole 244 opens at one corner of the rectangular. In plan view, the corner is sectioned by bank 252 having an arc-like shape and provided with a cutout part at a center portion thereof. The top edge of bank 252 is flush with second surface 202. Recess 251 has a depth of, for example, 1 mm.

As illustrated in FIG. 7A and FIG. 9A, film 300 is disposed integrally with emitter main body 200 through hinge part 301. In plan view, film 300 has a rectangular shape as with first surface 201. For example, the thickness of film 300 may be determined by a computer simulation or an experiment using a trial product or the like on the basis of the deformation amount under a pressure described later, and may be, for example, 0.15 mm.

As illustrated in FIG. 7A, FIG. 8B and FIG. 9A, hinge part 301 is disposed at an edge on first surface 201 side of emitter main body 200 in the Y direction. For example, hinge part 301 is a part which has a thickness identical to that of film 300 and a width of 0.5 mm and is molded integrally with emitter main body 200 and film 300.

Each of emitter main body 200 and film 300 is molded with one material having flexibility such as polypropylene, for example. Examples of the material include resin and rubber, and examples of the resin include polyethylene and silicone. The flexibility of emitter 120 and film 300 can be adjusted with use of elastic resin materials, and for example, can be adjusted by the type of an elastic resin, the mixing ratio of an elastic resin material to a hard resin material, and the like. Emitter 120 can be manufactured as an integrally molded member by injection molding, for example.

(Operation)

Film 300 turns about hinge part 301, and is closely joined on first surface 201 of emitter main body 200. For example, the joining is performed by welding of a resin material of emitter main body 200 or film 300, by bonding using an adhesive agent, by pressure bonding of film 300 to emitter main body 200 or the like.

As illustrated in FIG. 2A and FIG. 4A, by joining film 300 to first surface 201, intake channel 221 is covered with film 300, and groove 222 forms a plurality of channels opening at the side surface of emitter 120 and connected with intake channel 221. Thus, when film 300 is joined to first surface 201, intake channel 221 and groove 222 constitute an intake part for receiving the irrigation liquid in tube 110.

In addition, by joining film 300 to first surface 201, groove 241 and recessed surface part 242 are covered with film 300 as illustrated in FIG. 4A and FIG. 4B. The gap between recessed surface part 242 and film 300 serves as a channel for irrigation liquid. Further, when film 300 bends under the pressure of the irrigation liquid described later and makes close contact with recessed surface part 242, groove 243 and film 300 constitute a second channel which communicates between groove 241 and hole 244. The second channel formed by groove 243 and film 300 serves as a pressure reduction channel for allowing the irrigation liquid to flow therethrough while reducing the pressure of the irrigation liquid. Thus, when film 300 is joined to first surface 201, grooves 241 and 243 and recessed surface part 242 serve as a flow rate controlling part for controlling the flow rate of the irrigation liquid supplied from a first pressure reduction channel described later in accordance with the pressure of the irrigation liquid in tube 110.

Second surface 202 is joined to the inner wall surface of tube 110. This joining is performed by welding of the resin material of emitter main body 200 or tube 110, by bonding using adhesive agent, by pressure bonding of emitter main body 200 to tube 110, or the like.

When second surface 202 is joined to the inner wall surface of tube 110, second surface 202 makes close contact with tube 110, and intake channel 221 and grooves 231 to 233 are covered with tube 110. When grooves 231 to 233 are covered with tube 110, grooves 231 to 233 and hole 234 serve as a channel through which the irrigation liquid received from the intake part flows. Grooves 231 to 233 and hole 234 constitute a first channel through which the irrigation liquid received from the intake part flows when grooves 231 to 233 are covered with tube 110. In addition, groove 232 constitutes a pressure reduction channel for allowing the irrigation liquid to flow therethrough while reducing the pressure of the irrigation liquid.

In addition, when second surface 202 is joined to the inner wall surface of tube 110, recess 251 is covered with tube 110. Discharge port 130 is disposed at a position where tube 110 covers recess 251. In this manner, when second surface 202 is joined to tube 110, recess 251 serves as a discharge part to which the irrigation liquid having a flow rate controlled by the flow rate controlling part is supplied and which is configured to face discharge port 130.

Normally, emitter 120 is joined to the inner periphery wall of tube 110 before discharge port 130 is formed, and thereafter, discharge port 130 is formed at a position corresponding to a discharge part (recess 251) of tube 110. Alternatively, emitter 120 may be joined to the inner wall surface of tube 110 such that emitter 120 is located at the position of preliminarily provided discharge port 130.

Figure 10A:
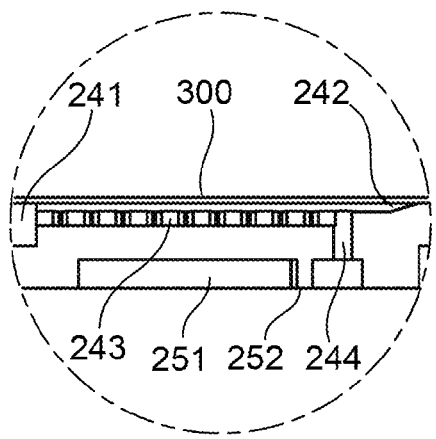
FIG. 10A illustrates part A of FIG. 4A in an enlarged manner in the case where the pressure of the irrigation liquid in the tube is equal to or higher than a first pressure value and lower than a second pressure value.
Figure 10B:
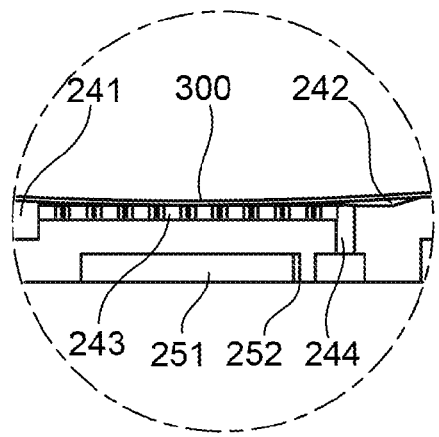
FIG. 10B illustrates part A of FIG. 4A in an enlarged manner in the case where the pressure of the irrigation liquid in the tube is equal to or higher than the second pressure value and lower than the third pressure value.
Figure 10C:
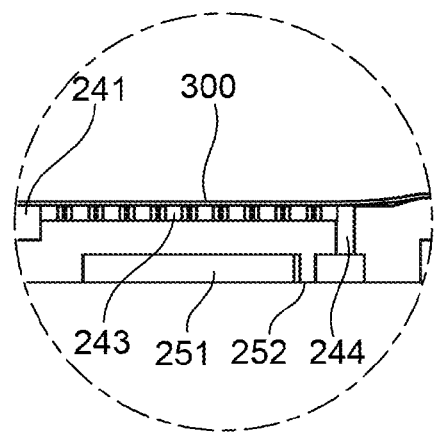
FIG. 10C illustrates part A of FIG. 4A in an enlarged manner in the case where the pressure of the irrigation liquid in the tube is equal to or higher than the third pressure value.

Next, discharge of irrigation liquid by emitter 120 is described. FIG. 10A illustrates part A of FIG. 4A in an enlarged manner in the case where the pressure of the irrigation liquid in tube 110 is equal to or higher than a first pressure value and lower than a second pressure value. FIG. 10B illustrates part A of FIG. 4A in an enlarged manner in the case where the pressure of the irrigation liquid in tube 110 is equal to or higher than the second pressure value and lower than the third pressure value. FIG. 10C illustrates part A of FIG. 4A in an enlarged manner in the case where the pressure of the irrigation liquid in tube 110 is equal to or higher than the third pressure value.

Supply of irrigation liquid to trickle irrigation tube 100 is performed in a range where the pressure of the irrigation liquid do not exceed 0.1 MPa for the purpose of preventing damaging of tube 110 and emitter 120. When irrigation liquid is supplied into tube 110, the irrigation liquid reaches intake channel 221 through a gap between film 300 and groove 222. The gap prevents intrusion of floating materials in the irrigation liquid which have a size greater than the opening of the gap into intake channel 221. Thus, film 300 and groove 222 function as a filter.

When the pressure of the irrigation liquid in tube 110 is equal to or higher than the first pressure value (for example, 0.005 MPa), flow rate regulation valve 223 is pushed to second surface 202 side, and the slit of flow rate regulation valve 223 is expanded. In this manner, the irrigation liquid reaching intake channel 221 is received by emitter main body 200 from intake channel 221. Flow rate regulation valve 223 suppresses inflow of the irrigation liquid to emitter main body 200 when the pressure of the irrigation liquid is lower than the first pressure value. Thus, high-pressure supply of the irrigation liquid to tube 110 can be achieved, and therefore the configuration in which emitter 120 has flow rate regulation valve 223 is favorable for forming trickle irrigation tube 100 having a greater length, for example.

The irrigation liquid received from intake channel 221 is supplied to groove 232 (pressure reduction channel) through groove 231. The pressure of the irrigation liquid flowing through groove 232 is reduced as a result of pressure loss caused by the shape (zigzag shape) in plan view of groove 232. In addition, floating materials in the irrigation liquid are entangled in the turbulent flow generated between the protrusions of groove 232 and are retained in groove 232. In this manner, the floating materials are further removed from the irrigation liquid by pressure reduction channel 230.

In addition, since the tip of the protrusion is disposed in such a manner that the tip does not exceed the center line of groove 232 in plan view, a space which is not blocked by the protrusion is formed at the center of groove 232 while the width of the space is small, and thus the irrigation liquid easily flow through groove 232. Accordingly, in addition to the effect of reducing pressure and the effect of removing the floating material, groove 232 is favorable for allowing irrigation liquid to flow with a greater flow rate.

The irrigation liquid having passed through groove 232 in which the pressure is reduced and the floating material is removed is supplied to recessed surface part 242 through groove 233, hole 234, and groove 241. As illustrated in FIG. 10A, the gap between film 300 and recessed surface part 242 and groove 243 formed on the bottom of recessed surface part 242 are filled with the irrigation liquid and the irrigation liquid is supplied to hole 244.

The irrigation liquid having passed through hole 244 reaches recess 251 and is then discharged out of tube 110 through discharge port 130 which faces recess 251 and opens at recess 252.

While foreign matters such as soil may intrude into recess 251 from discharge port 130, intrusion of such foreign matters into hole 244 is blocked by bank 252 disposed in recess 251.

As the pressure of the irrigation liquid in tube 110 increases, the flow rate of the irrigation liquid received by emitter main body 200 from intake channel 221 increases, and the discharge rate of the irrigation liquid from discharge port 130 increases.

When the pressure of the irrigation liquid in tube 110 is equal to or higher than the second pressure value (for example, 0.02 MPa), film 300 pushed by the irrigation liquid in tube 110 is bent as illustrated in FIG. 10B. Consequently, the distance between film 300 and recessed surface part 242 at the flow rate control part is reduced. For example, the distance between recessed surface part 242 and film 300 is changed to 0.15 mm. Consequently, the amount of the irrigation liquid which passes between film 300 and recessed surface part 242 is reduced, and the increase of the discharge rate of the irrigation liquid from discharge port 130 is suppressed.

When the pressure of the irrigation liquid in tube 110 is equal to or higher than the third pressure value (for example, 0.05 MPa), film 300 is pushed and further bent by the irrigation liquid in tube 110 and brought into close contact with recessed surface part 242 as illustrated in FIG. 10C. In this manner, film 300 functions as a valve element for sealing a hole which is a channel of the irrigation liquid under high pressure, and recessed surface part 242 functions as a valve seat of the valve element. Meanwhile, since groove 243 is not sealed even when film 300 makes close contact with recessed surface part 242, the irrigation liquid supplied to groove 241 is supplied to hole 244 through groove 243. Consequently, the amount of the irrigation liquid which passes through the flow rate controlling part is restricted to a flow rate which can pass through groove 243, and the discharge rate of the irrigation liquid from discharge port 130 becomes substantially constant. In this manner, emitter 120 quantitatively discharges the irrigation liquid from tube 110 supplied with the irrigation liquid.

In addition, the pressure of the irrigation liquid flowing through groove 243 is reduced by the pressure drop caused by the shape of groove 243 in a plan view (zigzag shape), and the floating materials in the irrigation liquid are entangled in the turbulent flow generated between the protrusions and are retained in groove 243. Further, since the tips of the protrusions are disposed such that the tips do not exceed the center line of groove 243 in plan view, the irrigation liquid easily flows through groove 243. Therefore, in addition to the effects of pressure reduction and removal of floating materials, groove 243 is favorable for achieving flow of irrigation liquid at a greater flow rate.

(Effect)

As described above, emitter 120 includes the intake part for receiving the irrigation liquid in tube 110, the first channel for allowing the irrigation liquid received from the intake part to flow therethrough, the flow rate control part for controlling the flow rate of the irrigation liquid supplied from the first channel in accordance with the pressure of the irrigation liquid in tube 110, and the discharge part to which the irrigation liquid having a flow rate controlled by the flow rate control part supplied, the discharge part facing the discharge port. In addition, the flow rate control part includes: recessed surface part 242 which is formed on first surface 201 at a portion which is not joined to tube 110 on the surface of emitter 120; groove 243 formed on the surface of recessed surface part 242 and configured to connect the first channel and the discharge part; and film 300 having flexibility which covers recessed surface part 242 to block the communication between the inside of tube 110 and recessed surface part 242. When emitter 120 is disposed in tube 110 by joining to the inner wall surface of tube 110 at a position corresponding to discharge port 130 of tube 110, trickle irrigation tube 100 is constituted. The first channel reduces the pressure of the irrigation liquid, and film 300 starts to bend when the pressure of the irrigation liquid in tube 110 is equal to or higher than the above-mentioned second pressure value, and film 300 makes close contact with recessed surface part 242 when the pressure is equal to or higher than the third pressure value. At this time, the second channel for irrigation liquid is constituted by groove 243 and film 300. Therefore, emitter 120 discharges the irrigation liquid such that the amount of the liquid is limited to the amount which passes through groove 243 even when the pressure of the irrigation liquid in tube 110 increases. In this manner, emitter 120 quantitatively discharges the irrigation liquid in tube 110 from discharge port 130 in accordance with the pressure of the irrigation liquid in tube 110, and thus can stabilize the discharge rate of the irrigation liquid.

Further, since the above-described components of emitter 120 are composed of a groove, a recess and a hole formed on first surface 201 or second surface 202 of emitter main body 200, emitter main body 200 can be integrally produced by injection molding. Therefore, emitter 120 can further reduce manufacturing cost in comparison with conventional emitters composed of three parts.

In addition, the configuration in which one or both of the first channel and the second channel is a pressure reduction channel for allowing the irrigation liquid to flow therethrough while reducing the pressure of the irrigation liquid is effective from the viewpoint of ensuring a desired discharge rate of the irrigation liquid, and in addition, from the viewpoint of reducing the clogging of emitter 120 due to floating materials in irrigation liquid. In particular, the configuration in which both of the first channel and the second channel is the pressure reduction channel is effective from the above-mentioned the standpoint. Further, the configuration in which both the first channel and the second channel are the pressure reduction channel can reduce the pressure of the irrigation liquid through two processes in emitter 120, and therefore the configuration is further effective also from the viewpoint of achieving supply of irrigation liquid to tube 110 at a higher pressure.

In addition, with the configuration in which the valley bottom line of recessed surface part 242 extends in the X direction and groove 243 is formed along the valley bottom line, a sufficient space is formed between recessed surface part 242 and film 300 when the pressure is low (when film 300 is not in close contact with recessed surface part 242), and therefore the configuration is further effective from the viewpoint of suppressing the pressure loss (pressure drop) of the irrigation liquid flowing through recessed surface part 242 and groove 243 when the pressure is low. In addition, since groove 243 has the above-described planar shape and irrigation liquid flows through groove 243 even when the pressure is low, the configuration in which groove 243 is formed along the valley bottom line is further effective from the viewpoint of achieving the effect of removing the floating materials even when the pressure is low.

In addition, with the configuration in which emitter 120 is molded with one material having flexibility and film 300 is integrally molded as a part of emitter 120 such that film 300 can close recessed surface part 242, both of emitter main body 200 and film 300 can be molded as one component by injection molding, and consequently manufacturing error of the joining position of film 300 can be prevented, which is further favorable from the standpoint of further reducing manufacturing cost, for example.

In addition, with the configuration in which the intake part further includes flow rate regulation valve 223 configured to expand the irrigation liquid channel at the intake part in accordance with the increase of the pressure of the irrigation liquid in tube 110, the irrigation liquid can be supplied to tube 110 with a higher pressure, which is further favorable from the viewpoint of forming trickle irrigation tube 100 having a greater length.

(Modification)

In trickle irrigation tube 100, the above-described configurations may be partially changed, or other configurations may be additionally adopted as long as the above-described effect is achieved.

For example, tube 110 may be a seamless tube, or a tube composed of slender sheet(s) joined together along the longitudinal direction.

In addition, discharge port 130 may be a gap formed at the above-mentioned joining part of the sheets so as to communicate between the inside and the outside of tube 110, or a pipe sandwiched by the sheets at the joining part. Further, the shape of the discharge port in an axial direction thereof may not be a straight line shape. Examples of the tube having the discharge port include a tube in which a depression having a desired shape and serving as a channel is formed on the surface of the above-mentioned sheet, and a discharge port composed of the channel is formed at the joining part when the sheets are joined together.

While intake channel 221 of emitter 120 is located at a position on the upstream side in the flow direction of the irrigation liquid in tube 110, intake channel 221 may be located at a position on the downstream side. In addition, the orientations of a plurality of emitters 120 in one tube 110 may be identical to one another or different from one another.

In addition, the resin material of emitter main body 200 and the resin material of film 300 may be identical to each other or different from each other.

While emitter main body 200 is integrally molded by injection molding of resin, emitter main body 200 may be composed of two components of a first surface 201 side component and a second surface 202 side component. In this case, the components on the first surface 201 side are molded integrally with film 300. With the configuration in which emitter main body 200 is composed of the two components, the first channel can be disposed inside emitter main body 200, for example. Further, the two components may be integrally molded through a hinge part.

In addition, the first channel may be composed of a groove on first surface 201 which is covered with film 300 in emitter main body 200.

In addition, second surface 202 may be a curved surface along the inner wall of tube 110 (for example, a surface defined by the arc whose arc radius is the internal diameter of tube 110 in the YZ plane).

Further, since it suffices to appropriately dispose flow rate regulation valve 223 in accordance with the pressure of the irrigation liquid supplied to tube 110, emitter 120 may not be provided with flow rate regulation valve 223.

In addition, from the viewpoint of ensuring a desired discharge rate and suppressing clogging of floating materials in irrigation liquid, emitter 120 is preferably has a configuration in which one or both of the first channel and the second channel includes the pressure reduction channel; however, both the first channel and the second channel may not be provided with the pressure reduction channel. To be more specific, while film 300 bends toward recessed surface part 242 and makes close contact with recessed surface part 242 with the pressure difference between the pressure of the irrigation liquid in tube 110 and the pressure of the irrigation liquid in recessed surface part 242, the first channel and the second channel may not be the above-described pressure reduction channel (for example, may be simple linear channels) as long as a sufficient pressure difference is obtained. For example, in the case where the intake part has a structure for receiving liquid irrigation into emitter 120 while reducing the pressure of the irrigation liquid such as a plurality of pores communicating between tube 110 and a channel in emitter 120, each of the first channel and the second channel may be composed of a channel other than the pressure reduction channel.

While recessed surface part 242 is a recessed curved surface slightly recessed from first surface 201 in the present embodiment, other suitable configurations may also be adopted as long as close contact with film 300 around groove 243 is achieved. For example, recessed surface part 242 may be a planar part located at a position nearer to second surface 202 side than first surface 201.

This application is entitled to and claims the benefit of Japanese Patent Application No. 2013-259219 filed on Dec. 16, 2013, the disclosure of which including the specification, drawings and abstract is incorporated herein by reference in its entirety.

INDUSTRIAL APPLICABILITY

According to the present invention, an emitter which can discharge liquid with an appropriate speed by the pressure of the liquid to be discharged can be easily provided. Accordingly, popularization of the above-mentioned emitter in technical fields of trickle irrigations, endurance tests and the like where long-term discharging is required, and further development of the technical fields can be expected.

REFERENCE SIGNS LIST

100 Trickle irrigation tube
110 Tube
120 Emitter
130 Discharge port
200 Emitter main body
201 First surface
202 Second surface
221 Intake channel
222, 231, 232, 233, 241, 243 Groove
223 Flow rate regulation valve
234, 244 Hole
242 Recessed surface part
251 Recess
252 Bank
300 Film
301 Hinge part

The invention claimed is:

1. An emitter for quantitatively discharging irrigation liquid in a tube from a discharge port communicating between inside and outside of the tube, the emitter being configured to be joined to an inner wall surface of the tube at a position corresponding to the discharge port, the tube being configured to distribute the irrigation liquid, wherein the emitter comprises:

an emitter main body, a film having flexibility, disposed integrally with the emitter main body through a hinge part, and closely joined on the surface of the emitter main body, an intake part for receiving the irrigation liquid in the tube, a first channel for allowing the irrigation liquid received from the intake part to flow therethrough, a flow rate control part for controlling a flow rate of the irrigation liquid supplied from the first channel in accordance with a pressure of the irrigation liquid in the tube, and a discharge part to face the discharge port, the discharge part being configured to be supplied with the irrigation liquid whose flow rate is controlled by the flow rate control part;

the intake part including:

an intake channel extending through the emitter main body, and four flexible opening-closing parts closing the intake channel, the opening-closing parts having a form in which a substantially hemisphere thin dome protruding from the surface side of the emitter main body towards an opposite side thereof is divided with slits in a cross shape;

the flow rate control part including:

a recessed surface part formed at a portion of a surface of the emitter where the surface of the emitter is not joined to the tube, a groove connecting the first channel and the discharge part and formed on a surface of the recessed surface part, and the film;

wherein:

the film seals the recessed surface part to block communication between inside of the tube and the recessed surface part, the intake part or the first channel reduces a pressure of the irrigation liquid, and when the pressure of the irrigation liquid in the tube is equal to or higher than a predetermined value, the film makes close contact with the recessed surface part, and the groove and the film form a second channel for allowing the irrigation liquid to flow therethrough.

2. The emitter according to claim 1, wherein one or both of the first channel and the second channel is a pressure reduction channel for allowing the irrigation liquid to flow therethrough while reducing the pressure of the irrigation liquid.

3. The emitter according to claim 1, wherein:

a valley bottom line of the recessed surface part extends along one direction, and the groove is formed along the valley bottom line.

4. The emitter according to claim 1, wherein:

the emitter is molded with one material having flexibility, and the film is integrally molded as a part of the emitter such that the film is capable of closing the recessed surface part.

5. The emitter according to claim 1, wherein the intake part further includes a flow rate regulation valve configured to expand the channel of the irrigation liquid when the pressure of the irrigation liquid in the tube is equal to or higher than the predetermined value.

6. A trickle irrigation tube comprising:

a tube; and at least one emitter, the emitter being the emitter according to claim 1 disposed on the tube.

* * * * *